United States Patent [19]

Saito et al.

[11] 4,237,485

[45] Dec. 2, 1980

[54] BUZZ CANCELLING SYSTEM FOR TELEVISION RECEIVER

[75] Inventors: Hiroshi Saito, Katano; Chihiro Adachi, Hirakata, both of Japan

[73] Assignee: Matsushita Electric Industrial Co., Ltd., Osaka, Japan

[21] Appl. No.: 3,539

[22] Filed: Jan. 15, 1979

[30] Foreign Application Priority Data

Jan. 19, 1978 [JP] Japan .................................. 53-5075
Oct. 16, 1978 [JP] Japan .............................. 53-127542

[51] Int. Cl.³ ............................................. H04N 5/60
[52] U.S. Cl. .................................... 358/197; 358/198; 455/304; 455/305
[58] Field of Search ............... 358/167, 177, 188, 197, 358/198; 179/1 P; 325/327, 476; 328/240, 265; 455/304, 305, 306

[56] References Cited

U.S. PATENT DOCUMENTS

| | | | |
|---|---|---|---|
| 2,750,441 | 6/1956 | Schlesinger | 358/198 |
| 2,901,536 | 8/1959 | Thomas, Jr. et al. | 358/197 |
| 3,538,245 | 11/1970 | Parker | 358/197 |
| 3,798,367 | 3/1974 | Schneider | 358/167 |

Primary Examiner—Benedict V. Safourek
Attorney, Agent, or Firm—Stevens, Davis, Miller & Mosher

[57] ABSTRACT

A television receiver in which video IF signal is detected to produce a sound IF signal which is then detected to produce a sound signal, while at the same time video signal is produced by detecting the video IF signal. A buzz cancelling system is provided in which phase-modulated component of the video IF signal is detected or, alternatively, the detected video signal is differentiated thereby to produce a buzz cancelling signal which is then synthesized with the sound signal to cancel out the buzz component contained therein.

5 Claims, 19 Drawing Figures

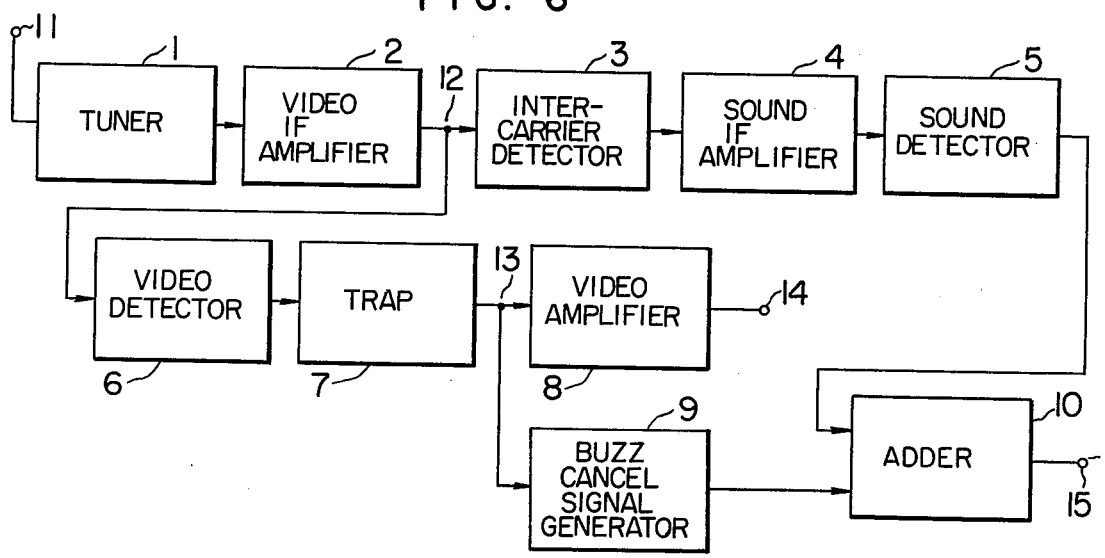
FIG. 6
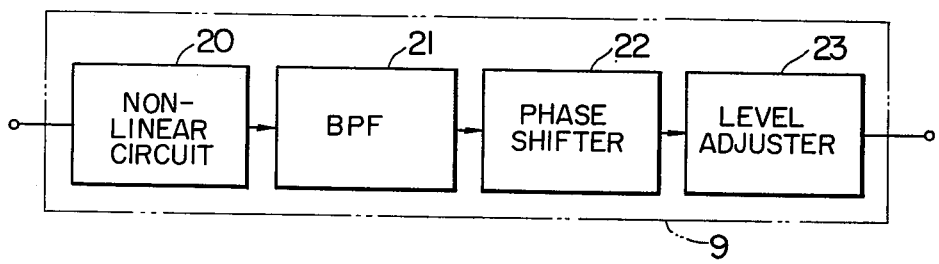
FIG. 7
FIG. 8
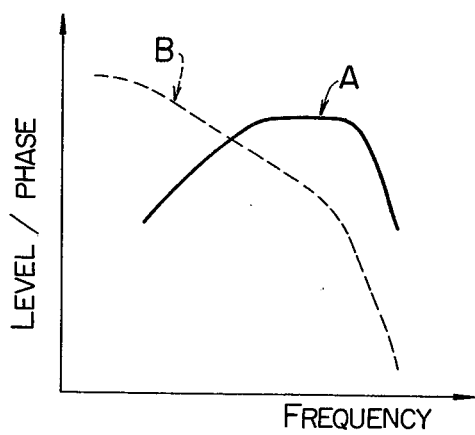
FIG. 9
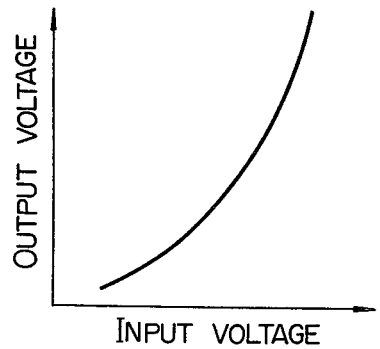

BUZZ CANCELLING SYSTEM FOR TELEVISION RECEIVER

BACKGROUND OF THE INVENTION

The present invention relates in general to a television receiver and more particularly to a buzz cancelling system for the television signal to remove the buzz component contained in a sound signal to be reproduced.

In hitherto known television receivers of inter-carrier system, buzz component due to interference of video signal is contained in the sound signal to be reproduced, which thus provides a difficulty in obtaining a reproduced sound of a better quality.

SUMMARY OF THE INVENTION

An object of the present invention is to provide a buzz cancelling system for a television receiver which is capable of removing the buzz component contained in the sound signal thereby to assure reproduction of the sound of a high quality in a simple circuit configuration.

In view of above and other objects which will become more apparent as description proceeds, there is proposed according to an aspect of the invention a buzz cancelling system for a television receiver in which video IF signal is detected to produce a sound signal, while video signal is produced by detecting the video IF signal. Phase-modulated component of the video IF signal is detected or alternatively the detected video signal is differentiated thereby to produce a buzz cancelling signal which is then added to the sound signal to cancel out the buzz component contained therein.

BRIEF DESCRIPTION OF THE DRAWINGS

FIG. 6 shows in a block diagram a main portion of a television receiver incorporating therein the buzz cancelling system according to another embodiment of the invention.

FIG. 7 shows in a block diagram a general arrangement of a buzz cancelling signal generator circuit employed in the television receiver shown in FIG. 6.

FIG. 8 graphically illustrates operation characteristics of the buzz cancelling signal generator shown in FIG. 6.

FIG. 9 grahically illustrates input-versus-output characteristics of the non-linear circuit shown in FIG. 7.

FIGS. 10a to 11f, 11a and 11b are signal wave forms to illustrate the principle of the invention in conjunction with the operations of the system shown in FIGS. 6 and 7.

DETAILED DESCRIPTION OF THE PREFERRED EMBODIMENTS

Figure 1:
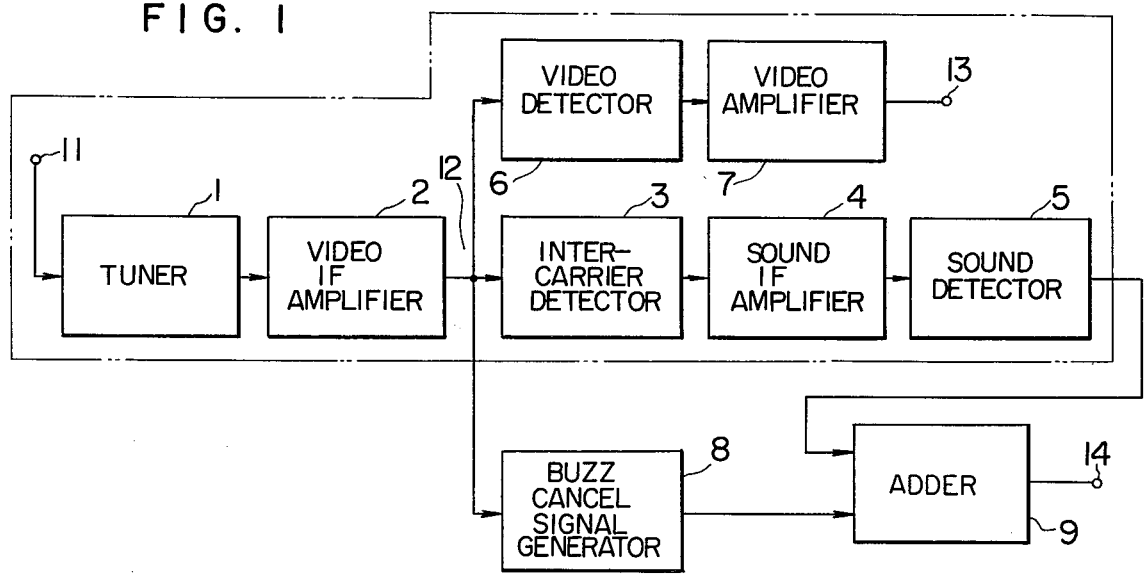
FIG. 1 is a block diagram to show a general arrangement of a main portion of a television receiver according to an embodiment of the invention.

Referring to FIG. 1 which shows in a block diagram a main portion of a television receiver, it should be first mentioned that the circuit arrangement shown as enclosed by a broken line has been hitherto known and includes a tuner 1, a video IF (intermediate frequency) amplifier 2, an inter-carrier detector 3, a sound IF amplifier 4, a sound detector circuit 5, a video detector circuit 6 and a video amplifier circuit 7. According to the teachings of the invention, there are provided a buzz component cancelling signal generator circuit 8 and a adder circuit 9. Reference numeral 11 denotes an antenna terminal, 12 denotes a division or branching point, and 14 denotes a sound signal output terminal.

A television signal as received by an antenna is applied to the tuner 1 through the antenna terminal 11 and hence to the video IF amplifier circuit 2. The output from the video IF amplifier 2 is divided at the division point 12 into inputs to the inter-carrier detector 3, the video detector circuit 6 and the buzz component cancelling signal generator circuit 8. The inter-carrier detector circuit 3 is adapted to generate a beat frequency of 4.5 MHz which is then applied to the sound IF amplifier circuit 4 and demodulated to a voice or sound signal at the sound detector circuit 5. The signal applied to the video detector circuit 6 undergoes detection of the video IF signal and makes appearance at the output terminal 13 as the video output signal after having been amplified by the video amplifier circuit 7.

On the other hand, the video IF signal applied to the buzz component cancelling signal generator circuit 8 is converted into a signal for cancelling out the video signal component or buzz component superposed on the sound signal output from the sound detector circuit 5.

Figure 2:
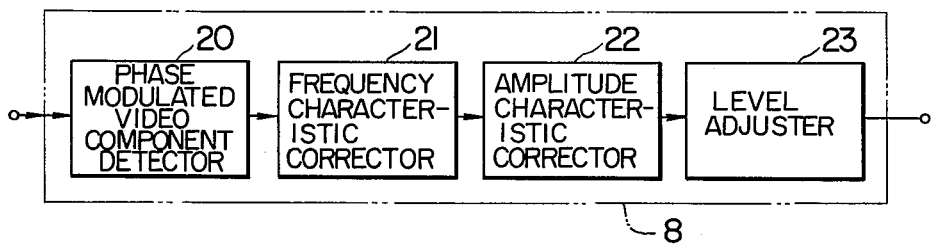
FIG. 2 is a block diagram showing a general arrangement of a buzz cancelling signal generator circuit according to an embodiment of the invention.
Figure 3:
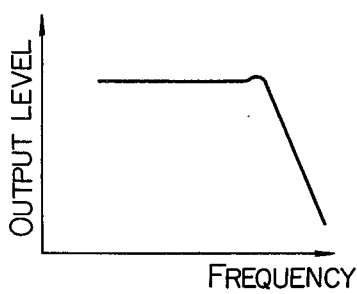
FIG. 3 illustrates graphically operation characteristic of a frequency characteristic correcting circuit used in the buzz cancelling signal generator circuit shown in FIG. 2.
Figure 4:
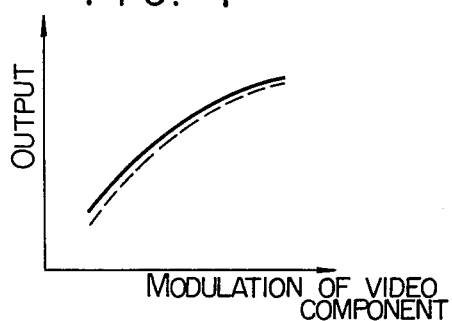
FIG. 4 illustrates graphically output characteristic of an amplitude characteristic correcting circuit employed in the buzz cancelling signal generator circuit shown in FIG. 2.

A general arrangement of the buzz component cancelling signal generator circuit 8 according to an embodiment of the invention is illustrated in FIG. 2 and includes a detector circuit 20 for detecting a phase-modulated signal component, a frequency characteristic correcting circuit 21, an amplitude characteristic correcting circuit or non-linear circuit 22 and a level adjusting circuit 23. Since among the video signals subjected to the amplitude modulation the signal component which has additionally undergone the phase modulation constitutes the primary factor for the generation of the buzz component, a part of the video IF signal is extracted from the branching point 12, whereby the phase-modulated component contained in the video IF signal is detected by the phase-modulated component detector circuit 20 which may be composed of a band-pass filter having a center frequency of 58.75 MHz±300 KHz, for example, an amplitude limiter and an FM detector circuit. The detected phase-modulated component then undergoes a band limitation at the frequency characteristic correcting circuit 21 so as to have a required characteristic such as illustrated in FIG. 3. The output signal from the correcting circuit 21 is further applied to the amplitude characteristic correcting circuit or non-linear circuit 22 and compensated so as to conform to variation in amplitude of the video component signal appearing at the output of the sound detector circuit, as is illustrated in FIG. 4 in which a curve a in solid line represents variation in amplitude of the output signal from the sound detector circuit 5, while a curve b in broken line represents the amplitude variation in the output signal from the amplitude characteristic correcting circuit 22. The output from the circuit 22 is applied to the adder circuit 9 after having undergone the level adjustment by the level adjusting circuit 23. The video component cancelling signal output from the buzz component cancelling signal generator 8 is applied to the adder circuit 9 in opposite phase to the video signal component appearing at the output of the sound detector circuit 5 so that the signal output from the generator circuit 8 may compensate the video signal component contained in the sound output signal from the sound detector circuit 5. In this connection, it will be noted that the level of the output signal from the level adjusting circuit 23 is so selected that such compensation can be effected in a satisfactory manner. Thus, it will be appreciated that only the sound signal may make appearance at the output terminal 14 of the synthesizer circuit 9.

The frequency characteristic correcting circuit 21 may be constituted by a low-pass filter, a high-pass filter or a band-pass filter. Further, the amplitude characteristic correcting circuit 22 may be implemented as a non-linear circuit by using diodes, transistors or the like.

Figure 5A:
FIGS. 5a to 5c show signal wave forms to illustrate operation of the buzz cancelling system according to the invention.
Figure 5B:
Figure 5C:

Referring to FIGS. 5a to 5c, it is assumed that a video signal modulated from a color bar signal as shown in FIG. 5a is applied to the antenna terminal 11. Then, a signal wave such as shown in FIG. 5b will appear at the output of the sound detector circuit 5 and constitute the interferring buzz which impedes a satisfactory reproduction of the sound signal.

With a view to eliminating the buzz component, the invention teaches that a portion of the video IF signal is derived from the output from the video IF amplifier circuit 2 at the branching point 2 and utilized for generating the buzz cancelling signal such as shown in FIG. 5c which is in the opposite phase relative to the buzz component (FIG. 5b). The buzz cancelling signal from the circuit 8 and the output signal from the sound detector circuit 5 containing the buzz (FIG. 5b) are applied to the synthesizer 9 whereby the buzz component is cancelled out by the buzz cancelling signal (FIG. 5c). Consequently, only the sound signal can be extracted from the output terminal 14, because the video signal component superposed on the output signal from the sound detector 5 is cancelled by the buzz cancelling signal from the circuit 8 according to the invention. It will be thus appreciated that the system according to the invention will assure generation of sound of a high quality without suffering from interference of the buzz component.

It should be mentioned that the circuit components of the buzz cancelling signal generator circuit 8 except for the phase-modulated component detector 20 may be omitted, if desired. Alternatively, a phase shifter circuit may be interposed to attain the required phase relation described above.

FIG. 6 shows in a block diagram another embodiment of the invention which includes a tuner 1, a video IF amplifier 2, an inter-carrier detector 3, a sound IF amplifier 4, a sound detector circuit 5, a video detector circuit 6, a trap circuit 7 for frequency of 4.5 MHz, a video signal amplifier circuit 8, a buzz component cancelling signal generator circuit 9 and a adder circuit 10. Reference numeral 11 denotes an antenna terminal, 12 and 13 denote branching or tap points, 14 denotes a video signal output terminal and 15 denotes a sound signal output terminal.

The television signal as applied to the antenna terminal 11 is supplied to the video IF amplifier circuit 2 through the tuner 1 and then fed to the inter-carrier detector circuit 3 from the branching point 12 on one hand and to the video detector circuit 6 on the other hand. Beat signal of 4.5 MHz is produced at the inter-carrier detector 3 and supplied to the sound IF amplifier circuit 4 to be subsequently demodulated to the sound signal by the sound detector circuit 5. Video IF signal is detected from the signal applied to the video detector circuit 6 and sound beat signal is eliminated from the video signal at the trap circuit 7 of 4.5 MHz. The output signal from the trap circuit 7 is applied to the video signal amplifier circuit 8 from the branching point 13 on one hand and to the buzz component cancelling signal generator circuit 9 on the other hand. The output signal from the video amplifier 8 appears as the amplified video signal at the output terminal 14. In the buzz component cancelling signal generator circuit 9, the detected video signal from which sound beat signal has been eliminated through the sound signal trap circuit 7 of 4.5 MHz is utilized for generating a signal which is destined to serve for cancelling out the video signal component superposed on the sound signal output from the sound detector circuit 5.

An exemplary arrangement of the buzz component cancelling signal generator circuit 9 is shown in FIG. 7 and may be composed of a non-linear circuit 20 constituted by diodes or the like, a band-pass filter 21 incorporating therein a differentiating circuit, a phase shifter 22 and a level adjusting circuit 23.

FIG. 8 illustrates operation characteristics of the buzz cancelling signal generator circuit 9, in which a curve A in solid line represents a frequency characteristic while a phantom curve B represents a phase characteristic. FIG. 9 illustrates graphically input-versus-output characteristic of the non-linear circuit 20. In the arrangement shown in FIG. 7, the phase shifter 22 may be spared, if desired. The buzz component cancelling signal produced from the circuit 9 is supplied to the adder circuit 10 in the opposite phase with the video signal component contained in the output signal from the sound detector circuit 5, whereby the video component (buzz component) superposed on the output signal from the circuit 5 is cancelled out by the compensating signal produced from the buzz component cancelling signal generator circuit 9. Thus, only the sound signal can be obtained from the output terminal 15 of the adder circuit 10.

Figure 10A:
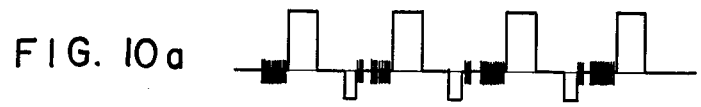
Figure 10B:
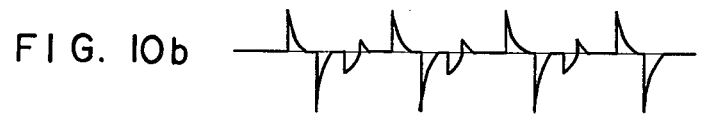

Referring to FIGS. 10a to 10f, when a signal modulated from a color bar signal is fed to the antenna terminal 11, there will appear a detected video signal such as illustrated in FIG. 10a at the branching point 13 through the video detector circuit and the 4.5 MHz trap circuit 7, while the signal of a waveform shown in FIG. 10b, for example, will appears at the output of the sound detector circuit 5. This signal is the buzz component which has been heretofore left as superposed on the sound signal as illustrated in FIGS. 11a and 11b and thus provided a difficulty in obtaining a reproduced sound of a high quality.

Figure 10C:
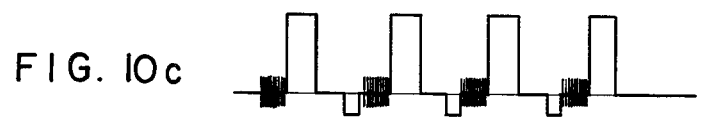
Figure 10D:
Figure 10E:
Figure 10F:
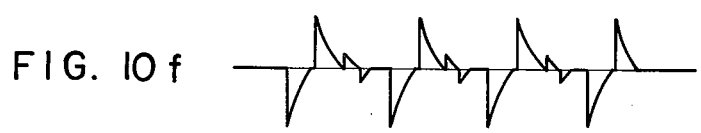
Figure 11A:
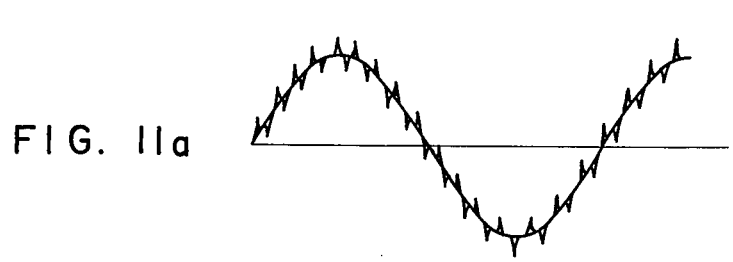
Figure 11B:
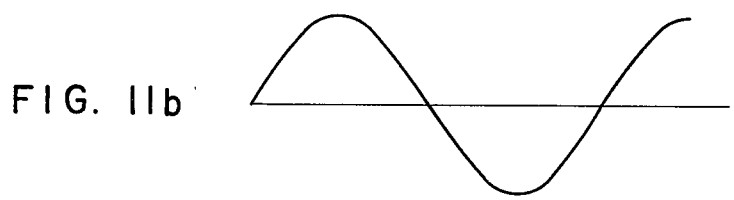

According to the invention, the detected video signal illustrated in FIG. 10a is supplied to the non-linear circuitry 20 of the buzz component cancelling signal generator circuit 9, as is illustrated in FIG. 10c, from which a signal of the wave form shown in FIG. 10d is derived through the differentiating circuitry incorporated in the band-pass filter 21. The signal of the waveform (FIG. 10d) is then applied to the phase shifter 22 to be converted to the phase-shifted signal such as shown in FIG. 10e, which is subsequently supplied to the level adjuster 23, which then produces the buzz cancelling signal of the wave form shown in FIG. 10f. The buzz cancelling signal (FIG. 10f) output from the buzz cancelling signal generator circuit 9 is in the opposite phase relative to the video component or buzz shown in FIG. 11a. Thus, through addition of these two signals at the adder 10, the buzz component (FIG. 11b) can be cancelled out, as the result of which a sound signal of a high quality can be reproduced.

It will be obvious that the output signal from the video amplifier circuit 8 may be supplied to the buzz component cancelling signal generator circuit 9 instead of directly applying thereto the output signal from the trap circuit 7.

As will be appreciated from the foregoing description, the present invention has now proposed a buzz component cancelling system for a television receiver which is capable of cancelling out the buzz component contained in the sound signal with a simple circuit configuration, thereby to enhance the quality of reproduced sound of the television receiver.

We claim:

1. A system for cancelling out buzz component from a sound signal in a television receiver, comprising: means for producing a sound IF signal through detection of a video IF signal, means for producing a sound signal by detecting said sound IF signal, means for producing a video signal by detecting said video IF signal, a buzz component cancelling a signal generator circuit for producing a buzz cancelling signal by detecting phase-modulated components of said video IF signal, and adder means for adding said buzz cancelling signal to said sound signal, whereby the buzz component contained in said sound signal is cancelled.

2. A system as set forth in claim 1, wherein said buzz component cancelling signal generator circuit includes differentiating circuitry for differentiating said detected video signal to produce the buzz cancelling signal, which is added to said sound signal thereby cancelling out said buzz component contained in said sound signal.

3. A system as set forth in claim 1, wherein said buzz component cancelling signal generator circuit comprises a detector circuitry for detecting a phase-modulated component of said video IF signal, a frequency characteristic correcting circuitry for limiting the frequency band of said phase-modulated component, and an amplitude correcting circuitry or non-linear circuitry for correcting the amplitude of said phase-modulated component.

4. A system as set forth in claim 2, wherein said buzz component cancelling signal generator circuit comprises non-linear circuitry for correcting the amplitude of the detected video signal, and differentiating circuitry for differentiating said video signal.

5. A system as set forth in claim 3, wherein said phase modulated component detecting circuit comprises a band-pass filter having a center frequency corresponding to said video IF frequency, an amplitude limiter circuit and an FM detector circuit.

* * * * *